US008296981B1

(12) United States Patent
Gardinier et al.

(10) Patent No.: US 8,296,981 B1
(45) Date of Patent: Oct. 30, 2012

(54) MODULAR DISPLAY SYSTEM

(76) Inventors: Jerry D. Gardinier, Pleasant Prairie, WI (US); Dennis Delfrate, Pleasant Prairie, WI (US)

(*) Notice: Subject to any disclaimer, the term of this patent is extended or adjusted under 35 U.S.C. 154(b) by 184 days.

(21) Appl. No.: 12/823,705

(22) Filed: Jun. 25, 2010

(51) Int. Cl.
*G09B 1/36* (2006.01)

(52) U.S. Cl. ............................. 40/605; 40/312; 446/124

(58) Field of Classification Search .................... 40/605, 40/312; 446/122, 124, 125, 106, 108, 110, 446/117, 118; D21/108, 501
See application file for complete search history.

(56) References Cited

U.S. PATENT DOCUMENTS 3,554,384 A * 1/1971 DeNatale ...................... 211/194
4,166,332 A 9/1979 Donovan
4,302,897 A 12/1981 Deckys
4,423,913 A * 1/1984 Lee .............................. 312/107
4,566,211 A 1/1986 Gustafson et al.
4,705,178 A 11/1987 Vail, Sr. et al.
4,785,565 A 11/1988 Kuffner
D307,079 S 4/1990 Robertson
4,925,038 A 5/1990 Gajewski
5,145,060 A 9/1992 Maye
5,322,024 A 6/1994 Avery et al.
5,554,062 A * 9/1996 Goldsen ........................ 446/124
5,833,465 A * 11/1998 Jarzewiak ..................... 434/171
6,012,581 A 1/2000 Galazzo

* cited by examiner

*Primary Examiner* — Casandra Davis

(74) *Attorney, Agent, or Firm* — Montgomery Patent & Design, LLC; Robert C. Montgomery; Joseph Yaksich

(57) ABSTRACT

A novelty advertising system using a plurality of hollow plastic rectangular enclosures simulating stacking boxes of real products to construct an advertising display is herein disclosed. The hollow enclosures provide replaceable advertising inserts depicting the product being sold. Each enclosure is provided with a plurality of interlocking posts and sockets allowing creation of large stable displays without using large quantities of real product which cannot be sold. Such displays can be built with minimal expense while avoiding a danger of toppling displays built with the actual heavy product.

11 Claims, 5 Drawing Sheets

MODULAR DISPLAY SYSTEM

RELATED APPLICATIONS

The present invention was first described in a notarized Official Record of Invention on Feb. 16, 2009, that is on file at the offices of Montgomery Patent and Design, LLC, the entire disclosures of which are incorporated herein by reference.

FIELD OF THE INVENTION

The present invention relates generally to merchandise displays, and in particular, to a modular display unit which provides features of size, shape and aesthetic customizability.

BACKGROUND OF THE INVENTION

In the field of merchandise, marketing and display of products represents one of the most important aspects of the business. Through the modern day, merchandise displays located in windows or the interior of stores are a common method of drawing attention to particular items in hopes of maximizing sales of those particular products. Such display near the actual point of purchase has proven to be very effective.

Many methods for displaying items are common in merchandising locations. Common practices include those of shelving systems intended to hold a plurality of an item in an organized manner, customized display racks or units particularly adapted for the positioning of a particular product in a visually unique manner, the use of large signs advertising products and sales, and the stacking of many units to form larger, more noticeable display units.

Various attempts have been made to provide adjustable or customizable display units. Examples of these attempts can be seen by reference to several U.S. patents. U.S. Pat. No. 4,302,897, issued in the name of Deckys, describes a modular display system which utilizes a plurality of corrugated board portions. The Deckys system provides collapsible units which may be assembled and stacked at the location of display.

U.S. Pat. No. 4,925,038, issued in the name of Gajewski, describes a display fixture with modular display units. The Gajewski apparatus provides a pair of opposing sidewalls and a plurality of shelves which allow for the selective placement of a plurality of tray-like carrier portions for the display of merchandise.

U.S. Pat. No. 5,322,024, issued in the name of Avery et al., describes a modular merchandise display unit with removably attachable shelving units.

U.S. Pat. No. 6,012,581, issued in the name of Galazzo, describes a stacking display for merchandise which provides a means for securely vertically extending a plurality of products for display.

Additionally, ornamental designs for a display unit exist, particularly U.S. Pat. No. D 307,079. However, none of these designs are similar to the present invention.

While these devices fulfill their respective, particular objectives, each of these references suffer from one (1) or more of the aforementioned disadvantages. Many such devices do not provide full customizability with regards to shape. Furthermore, many such devices are not customizable or adjustable with regards to size, particularly in three (3) dimensions, in order to accommodate an available or desired display area. In addition, many such devices do not provide a means for easily changing indicia and other aesthetic aspects of the display unit with full replacement. Also, many such devices require the use of saleable product for the display and lose aesthetic function when a contained product is removed. Accordingly, there exists a need for a modular display unit without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide modular, customizable, size adjustable three dimensional display capabilities which allow a user to selectively provide a desired shape and aesthetic appearance. Thus, the object of the present invention is to solve the aforementioned disadvantages and provide for this need.

To achieve the above objectives, it is an object of the present invention to provide a modular advertising system particularly suited for replacing stacked boxes of product such as canned soda or the like.

Another object of the present invention is to provide an eye-catching, customizable display for merchandise.

Yet still another object of the present invention is to enable a user to create a custom three-dimension display including any number of possible perimeter shapes.

The system comprises a plurality of rectangular primary display boxes with corresponding posts and sockets which allow a user to securely stack the boxes in a plurality of configurations. The system further comprises a plurality of rectangular secondary display boxes which are selectively attachable to the front faces of the primary display boxes via corresponding post and socket portions, allow for three-dimensional protrusions along a front portion of a display.

Yet still another object of the present invention is to eliminate the need to use large quantities of saleable product for display purposes.

Yet still another object of the present invention is to allow a user to increase or decrease the size of the display to amicably fill an available display space.

Yet still another object of the present invention is to provide effective advertising for various products. The system further comprises a plurality of decorative or colorful product cards which are removably insertable into a channel along the front face of each display box. The front face of the display may then be provided with any number of desired cards to present a desired marketing scheme.

Yet still another object of the present invention is to provide safety and security to the display via an annular ring construction of the posts and sockets which provides a positive snapping engagement in order to protect against accidental collapse of the system.

Yet still another object of the present invention is to provide a method of utilizing the device that provides a unique means of obtaining a plurality of first and second display boxes, providing a desired size and perimeter shape via interlocking stacking attachment of first display boxes, providing second display boxes along a front face to provide a desired three-dimensional appearance, selectively providing each display box with product cards to achieve a desired marketing scheme, easily detaching, removing, and transporting display boxes, and easily removing and replacing product cards to change the appearance of the display.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
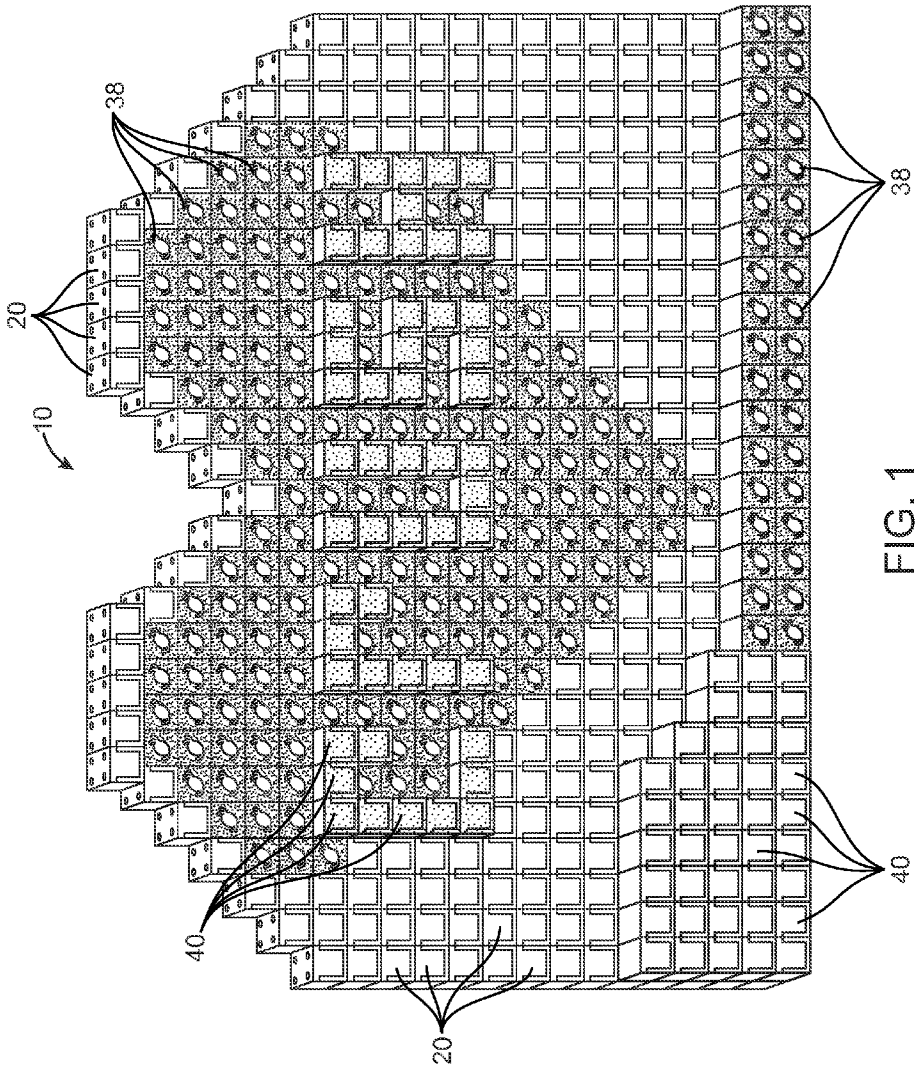
FIG. 1 is a front perspective view of a modular display system 10, according to a preferred embodiment of the present invention; and, FIG. 2*a* is a side perspective view of a primary display box portion 20 of the modular display system 10, according to a preferred embodiment of the present invention.

| | |
|---|---|
| 10 | modular display system |
| 20 | primary display box |
| 22 | top surface |
| 23 | bottom surface |
| 24 | first side surface |
| 25 | second side surface |
| 26 | front surface |
| 27 | rear surface |
| 28 | card bracket |
| 30 | post |
| 32 | socket |
| 34 | male annular ring |
| 36 | female annular ring |
| 38 | product card |
| 39 | indicia |
| 40 | secondary display box |
| 41 | secondary display box body |
| 42 | clearance slot |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a modular display system (herein described as the "system") 10, which provides an advertising system intended to replace stacks of boxes containing canned soda, canned beer, or similarly boxed products being arranged therein interesting and eye-catching shapes to create an advertising display. The system 10 comprises a plurality of hollow plastic primary display boxes 20 having removably attached product cards 38 affixed thereto end portions depicting the product being sold. All six (6) sides of each primary display box 20 comprise a plurality of interlocking posts 30 and sockets 32, enabling secure attachment of additional primary display boxes 20 or attachment of secondary display boxes 40 which provide an accenting protruding surface, thereby creating a three-dimensional effect. Any number of primary 20 and secondary 40 display boxes may be interlocked to produce large displays without risk of toppling. The system 10 eliminates a requirement of using large quantities of actual product which cannot be sold, as well as preventing a hazard to customers if said heavy product is accidentally knocked over.

Referring now to FIG. 1, a front perspective view of a modular display system 10, according to a preferred embodiment of the present invention, is disclosed. The system 10 comprises a plurality of primary display boxes 20, a plurality of product cards 38, and a plurality of secondary display boxes 40. The system 10 is illustrated here depicting an attractive display in a form of a large wall; however, interlocking elements of the system 10 enable arrangement thereof to form any number of perimeter shapes depicting forms such as, but not limited to: geometric shapes, random shapes, animals, alphanumeric characters, or the like. Furthermore, the system 10 may comprise an overall size and shape based upon available space, a user's preference, or a particular advertising scheme. The system 10 comprises an assembly of interlocking primary 20 and secondary 40 display boxes. The system 10 further comprises a plurality of decorative and/or colorful product cards 38 along outwardly facing surfaces of said primary 20 and secondary 40 display boxes having various indicia 39 including specific registered or unregistered product symbols, solid colors, logos, and the like, thereby collectively forming a composite shape, logo, character, or the like. Said product cards 38 provide effective advertising of various products such as, but not limited to: soft drinks, beer, or other products to be sold. Additionally, rear surfaces of the primary display boxes 20 also provide attachment thereof additional primary display boxes 20, secondary display boxes 40, and product cards 38, as required to create a double-sided display to advertise a single product or two (2) different products on front and back sides based upon a particular product advertisement scheme and a user's preference.

The primary display boxes 20 comprise molded or extruded hollow plastic enclosures having approximate dimensions of twelve (12) inches deep, five (5) inches high, and five (5) inches wide. Each primary display box 20 provides an attachment means along a front surface 26 and/or a rear surface 27 thereto a secondary display boxes 40 via post 30 and socket 32 fastening portions (see FIGS. 3*a*, 3*b*, and 4). The secondary display boxes 40 comprise identical height and width dimensions as the aforementioned primary display boxes 20 although having a depth of approximately two (2) inches deep, using similar construction and materials as the primary display boxes 20. Said secondary display boxes 40 therefore provide an extended forward surface, thereby forming a geometric contrast therewith adjacent primary display boxes 20 to form an eye-catching effect comprising various shapes, logos, characters, or the like.

Figure 2A:
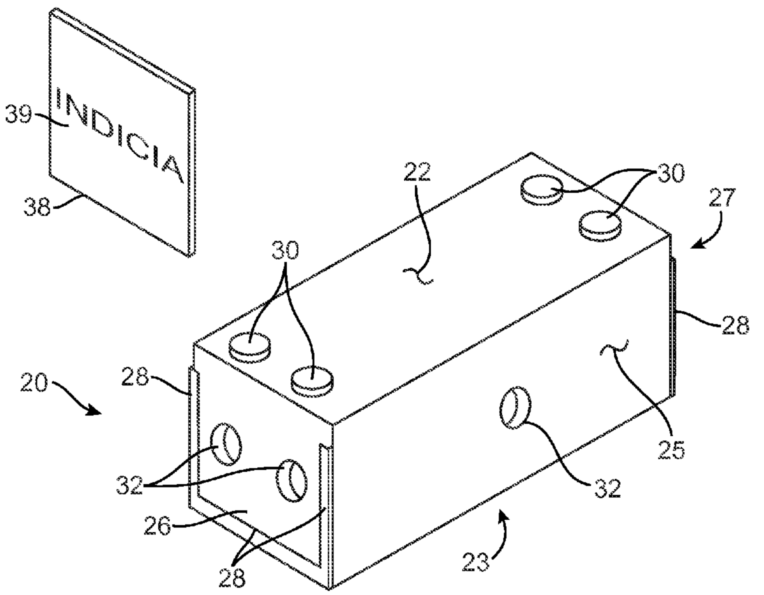
FIG. 2*b* is a bottom perspective view of a primary display box portion 20 of the modular display system 10, according to a preferred embodiment of the present invention.
FIG. 2*c* is a side perspective view of a plurality of primary display boxes 20 having been arranged in an overlapping configuration, according to a preferred embodiment of the present invention.
Figure 2B:
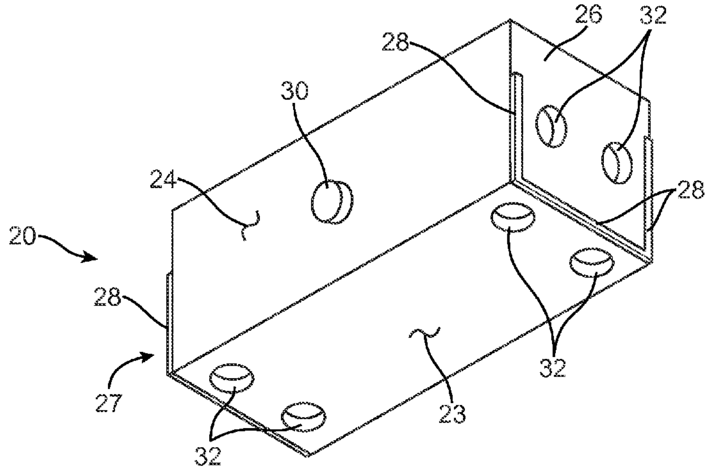

Referring now to FIGS. 2*a* and 2*b*, side and bottom perspective views of a primary display box portion 20 of the modular display system 10, according to a preferred embodiment of the present invention, are disclosed. Each primary display box 20 comprises a six-sided rectangular structure further comprising a top surface 22, a bottom surface 23, a first side surface 24, a second side surface 25, a front surface 26, and a rear surface 27.

The top surface 22 of each primary display box 20 comprises four (4) integrally-molded cylindrically-shaped posts 30 located thereat corner positions protruding upwardly being approximately one-half (½) inch high and one-half (½) in diameter. Four (4) geometrically matching sockets 32 are integrally-molded into the bottom surface 23 therein vertically corresponding positions, thereby allowing interlocking stacking of a plurality of primary display boxes 20 thereupon each other in a vertical manner (see FIG. 1). In like manner, the first side surface 24, located thereat a left-hand position along said box 20, comprises a single post feature 30 centered thereupon which correspondingly engages a matching socket portion 32 located along the opposing second side surface 25, thereby establishing secure mechanical connection between adjacent primary display boxes 20 in a horizontal direction. Each post 30 and corresponding socket 32 provides an inserting and locking means via an interfering male annular ring 34 and a female annular ring 36, respectively (see FIG. 4). Also in like manner, the front 26 and rear 27 surfaces each comprise a pair of sockets 32 and posts 30, respectively, being arranged along a horizontal centerline enabling connection thereof additional first 20 or second 40 display boxes if desired.

Said front 26 and rear 27 surfaces of the primary display boxes 20 further comprise integrally-molded card brackets 28 being affixed thereto lower and side edge regions thereof forming a "U"-shaped channel feature. The card brackets 28 comprise an encompassing three-sided channel in which a product card 38 may be slidingly inserted and held in place. The product card 38 comprises a rectangular plastic or paper flat panel having a variety of printed or painted indicia 39 displayed thereupon one (1) or both outer surfaces to aid in visually advertising of a product to be sold. Said product card 38 is envisioned to contain various indicia 39 such as, but not limited to: logos, alphanumeric characters, pictures, solid colors, patterns, and the like, thereby communicating an attractive product advertisement means (see FIG. 1)

Figure 2C:
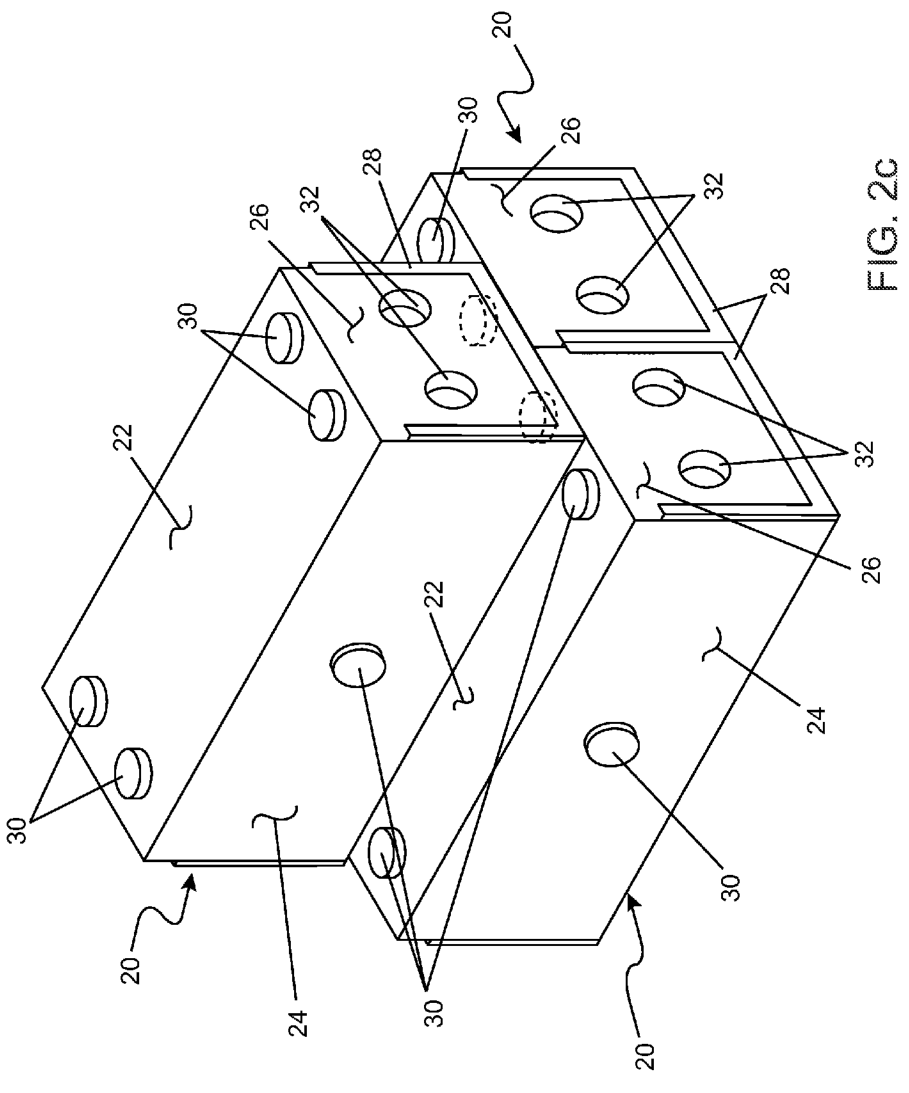

Referring now to FIG. 2*c*, a side perspective view of a plurality of primary display boxes 20 having been arranged in an overlapping configuration, according to a preferred embodiment of the present invention, is disclosed. Said primary display boxes 20 comprise a plurality of specifically positioned posts 30 and sockets 32 along outer surfaces which enable various arrangement designs. Said primary display boxes 20 may be stacked in a vertically aligned manner to form one (1) or more parallel columns (see FIG. 1). Additionally, said posts 30 and sockets 32 enable said primary display boxes 20 to be interlockingly arranged in a horizontally overlapping manner forming a pattern being similar to a conventional arrangement of building bricks as seen here.

Figures 3A, 3B:
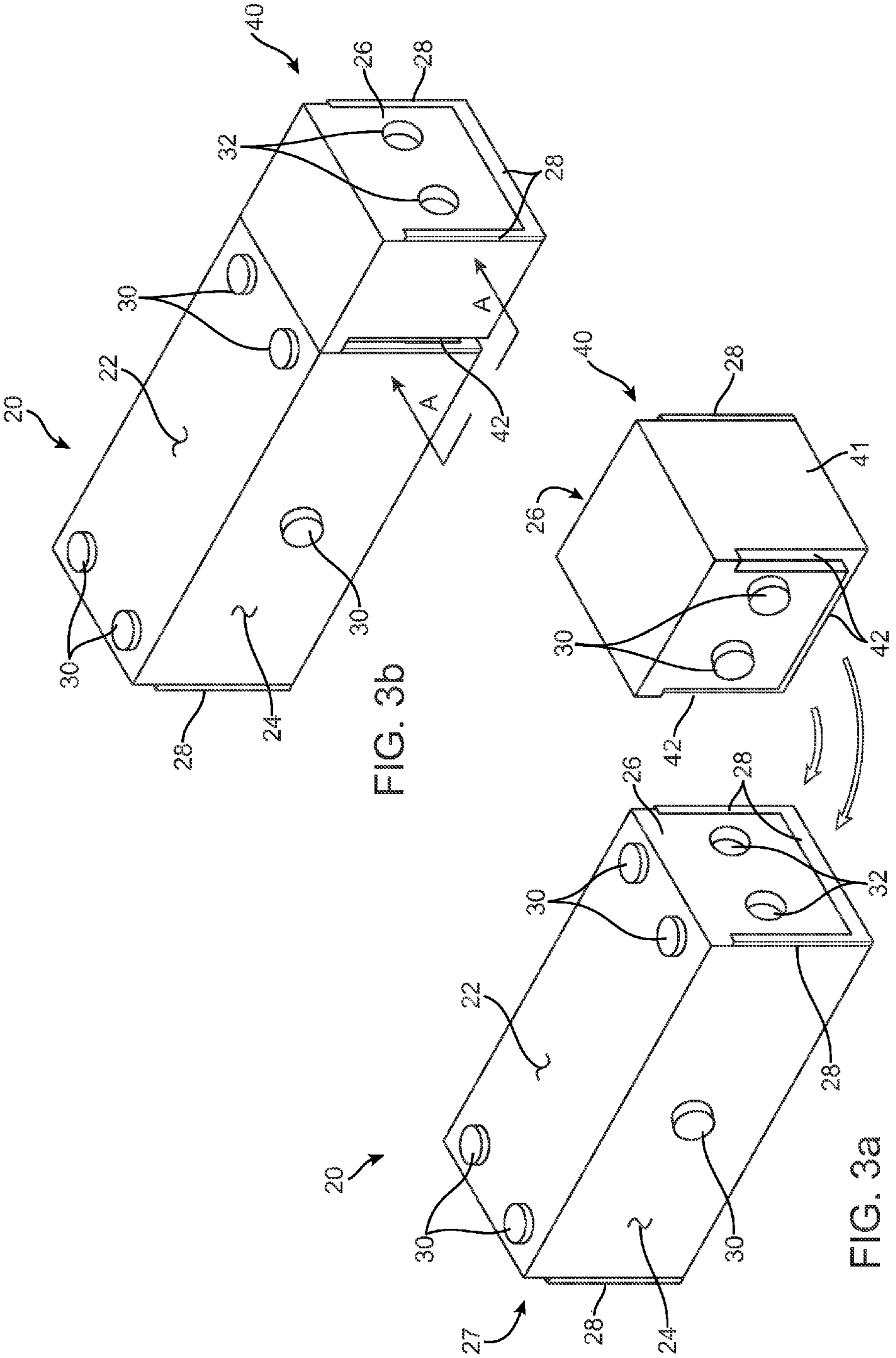
FIG. 3*a* is a perspective view of the modular display system 10 depicting a secondary display box portion 40 in a detached state, according to a preferred embodiment of the present invention.
FIG. 3*b* is a perspective view of the modular display system 10 depicting the secondary display box portion 40 in an attached state, according to a preferred embodiment of the present invention; and, FIG. 4 is a section view of post 30 and socket 32 portions of the modular display system 10 depicting an inserted state taken along section A-A (see FIG. 3*b*), according to a preferred embodiment of the present invention.

Referring now to FIGS. 3*a* and 3*b*, perspective views of the modular display system 10 depicting the secondary display box portion 40 in detached and attached states, according to a preferred embodiment of the present invention, are disclosed. The secondary display box 40 comprises a card bracket 28, a pair of posts 30, and a pair of clearance slots 42. Attachment of the secondary display box 40 thereto the primary display box 20 is accomplished via locking insertion of the post portions 30 of the secondary display box 40 into the socket portions 32 of the primary display box 20 as previously described. The clearance slot 42 provides clearance between the secondary display box 40 and the card bracket portion 28 of the primary display box 20, thereby allowing flush mounting between said primary 20 and secondary 40 display boxes as seen in FIG. 3*b*. The card bracket 28 portion of the secondary display box 40 provides insertion of a product card 38 as previously described (see FIG. 2*a*).

Figure 4:
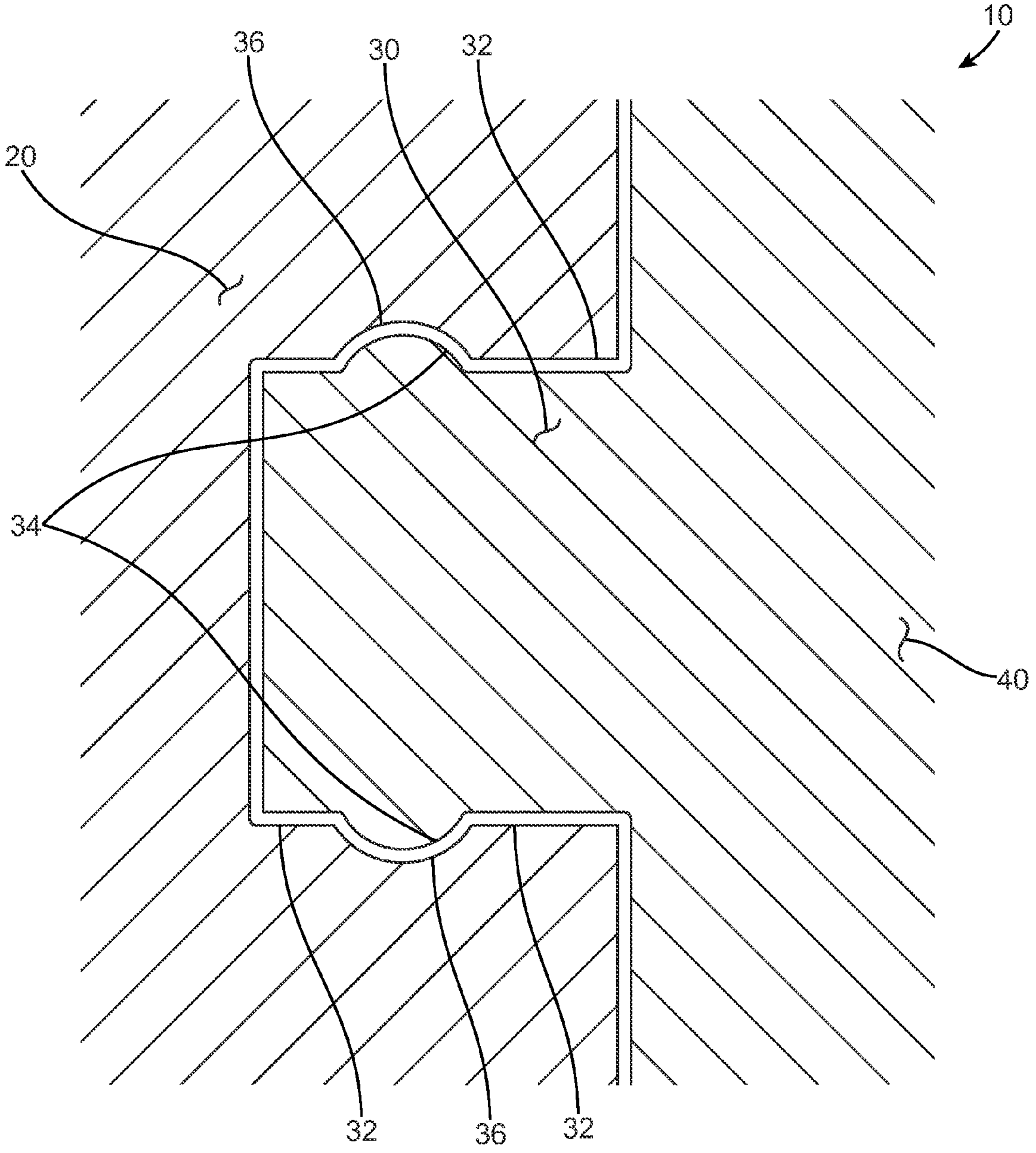

Referring now to FIG. 4, a section view of post 30 and socket 32 portions of the modular display system 10 depicting an inserted state taken along section A-A (see FIG. 3*b*), according to a preferred embodiment of the present invention, is disclosed. The post 30 and socket 32 portions comprise cylindrical-shaped integrally-molded insertable male and female features which further comprise a respective circular male annular ring 34 and a female annular ring 36. Said annular ring features 34, 36 provide a light interference fit between to securely fasten adjacent primary 20 and secondary 40 display box portions of the system 10, while allowing easy manual disconnection from each other during disassembly. The male 34 and female 36 annular rings comprise circular features having a generally semi-circular cross sectional shape, thereby providing a positive snapping engagement therewith each other during assembly, thereby securing the system 10 together and protecting against accidental collapse of the system 10 in an event of being bumped into.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIGS. 1, 2*a*, and 3*a*.

The method of installing and utilizing the system 10 may be achieved by performing the following steps: selecting a suitable location upon a flat floor surface to assemble the system 10 within a store, school, commercial location, or the like; laying out a first layer of primary display boxes 20 thereupon a floor surface by having all top surfaces 22 facing upwardly; having all first side surfaces 24 facing in a left-hand direction; interlocking all primary display boxes 20 together by inserting the post 30 and socket 32 portions along the side surfaces 24, 25 until sensing a positive snapping engagement of the male 34 and female 36 annular ring portions; and, repeating the previously described steps to assemble additional primary display boxes 20 in vertical, horizontal, and horizontally overlapping directions until creating a desired overall display shape. The method of completing a two-dimensional display of the system 10 may be accomplished by inserting a desired number of product cards 38 into the card brackets 28, having various indicia 39 including various colors, logos, and the like, to obtain a desired advertisement scheme.

The method of creating a three-dimensional display of the system 10 may be accomplished by the following additional steps: attaching a desired number of secondary display boxes 40 thereto front 26 and rear 27 surfaces of the primary display boxes 20 so as to form a desired composite protruding shape, thereby forming a message, logo, or the like, by inserting the post portions 30 of the secondary display boxes 40 into the socket portions 32 of the primary display boxes 20 as previously described; and, inserting a desired number of product cards 38 into the card bracket portions 28 of the secondary display boxes 40 to obtain a desired advertisement scheme.

Due to the two-sided nature of the system 10, the previously described two-dimensional and three-dimensional configurations of the system 10 may be utilized equally along one (1) or both sides of the system 10 as desired to advertise same or different products based upon a user's preference.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A modular display system arranged for creating an advertising display, said modular display system comprising:

a plurality of primary display boxes, each further comprising:

a plurality of posts;

a plurality of sockets;

a top surface having a first group of said posts located at opposed corners thereof;

a bottom surface having a first group of said sockets located at opposed corners thereof and corresponding to positions of said first group of posts respectively;

a first side surface having one of said posts centrally located thereof;

a second side surface having one of said sockets located centrally thereof;

a front surface having a second group of said sockets arranged along a horizontal centerline; and, a rear surface having a third group of said sockets arranged along a horizontal centerline;

a plurality of secondary display boxes detachably interlocked with said primary display boxes; and, a plurality of product cards removably affixed to said primary and secondary display boxes;

wherein said primary and secondary display boxes are arranged in a free-standing configuration: and, wherein said top surface, said bottom surface, said first side surface, said second side surface, said front surface, and said rear surface cooperatively form a six-sided rectangular structure.

2. The modular display system of claim 1, wherein each of said posts and each of said sockets are removably interlocked such that said primary display boxes are vertically stacked;

wherein said one post of said first side surface of a first one of said primary display boxes engages said one socket of said second side surface of a second one of said primary display boxes such that said first and second primary display boxes are horizontally aligned; and, wherein said first groups of posts and sockets of said first primary display box are interconnected to said first groups of sockets and posts of said second primary display box respectively.

3. The modular display system of claim 2, wherein each of said primary display boxes comprises: a card bracket formed along lower side edges and a bottom edge of each of said front and rear surfaces respectively, said card bracket forming a three-sided U-shape channel;

wherein said product cards are slidingly inserted and held in place in said card brackets respectively.

4. The modular display system of claim 3, wherein each of said secondary display boxes further comprises: a body including:

a front surface having a plurality of sockets arranged along a horizontal centerline;

a card bracket formed along lower side and bottom edges of a first side of said body;

a rear surface having a plurality of posts arranged along a horizontal centerline; and, a clearance slot formed along lower side and bottom edges of a second side of said body respectively;

wherein said secondary display boxes forwardly extend from said primary display boxes respectively; and, wherein said clearance slot is spaced from said card bracket of said primary display box such that said primary and said secondary display boxes are flush-mounted together.

5. The modular display system of claim 4, wherein said posts of said secondary display boxes have a male annular ring, wherein said second group of sockets of said primary display boxes have a female annular ring; wherein said male annular ring is interlocked with said female annular ring respectively.

6. A modular display system arranged for creating an advertising display, said modular display system comprising:

a plurality of coextensively shaped primary display boxes, each further comprising:

a plurality of posts;

a plurality of sockets;

a top surface having a first group of said posts located at opposed corners thereof;

a bottom surface having a first group of said sockets located at opposed corners thereof and corresponding to positions of said first group of posts respectively;

a first side surface having one of said posts centrally located thereof;

a second side surface having one of said sockets located centrally thereof;

a front surface having a second group of said sockets arranged along a horizontal centerline; and, a rear surface having a third group of said sockets arranged along a horizontal centerline;

a plurality of coextensively shaped secondary display boxes detachably interlocked with said primary display boxes; and, a plurality of product cards removably affixed to said primary and secondary display boxes;

wherein said primary and secondary display boxes are arranged in a free-standing configuration: and wherein said top surface, said bottom surface, said first side surface, said second side surface, said front surface, and said rear surface cooperatively form a six-sided rectangular structure.

7. The modular display system of claim 6, wherein each of said posts and each of said sockets are removably interlocked such that said primary display boxes are vertically stacked; wherein said one post of said first side surface of a first one of said primary display boxes engages said one socket of said second side surface of a second one of said primary display boxes such that said first and second primary display boxes are horizontally aligned; and, wherein said first groups of posts and sockets of said first primary display box are interconnected to said first groups of sockets and posts of said second primary display box respectively.

8. The modular display system of claim 7, wherein each of said primary display boxes comprises: a card bracket formed along lower side edges and a bottom edge of each of said front and rear surfaces respectively, said card bracket forming a three-sided U-shape channel;

wherein said product cards are slidingly inserted and held in place in said card brackets respectively.

9. The modular display system of claim 8, wherein each of said secondary display boxes further comprises: a body including:

a front surface having a plurality of sockets arranged along a horizontal centerline;

a card bracket formed along lower side and bottom edges of a first side of said body;

a rear surface having a plurality of posts arranged along a horizontal centerline; and, a clearance slot formed along lower side and bottom edges of a second side of said body respectively;

wherein said secondary display boxes forwardly extend from said primary display boxes respectively; and, wherein said clearance slot is spaced from said card bracket of said primary display box such that said primary and said secondary display boxes are flush-mounted together.

10. The modular display system of claim 9, wherein said posts of said secondary display boxes have a male annular ring, wherein said second group of sockets of said primary display boxes have a female annular ring; wherein said male annular ring is interlocked with said female annular ring respectively.

11. A method of utilizing a modular display system arranged for creating an advertising display, said method comprising the steps of:

providing a plurality of coextensively shaped primary display boxes, each further comprising:

a plurality of posts;

a plurality of sockets;

a top surface having a first group of said posts located at opposed corners thereof;

a bottom surface having a first group of said sockets located at opposed corners thereof and corresponding to positions of said first group of posts respectively;

a first side surface having one of said posts centrally located thereof;

a second side surface having one of said sockets located centrally thereof;

a front surface having a second group of said sockets arranged along a horizontal centerline; and, a rear surface having a third group of said sockets arranged along a horizontal centerline;

wherein said top surface, said bottom surface, said first side surface, said second side surface, said front surface, and said rear surface cooperatively form a six-sided rectangular structure;

providing and detachably interlocking a plurality of coextensively shaped secondary display boxes with said primary display boxes;

providing and removably affixing a plurality of product cards to said primary and secondary display boxes; and, arranging said primary and secondary display boxes in a free-standing configuration.

* * * * *